(12) United States Patent
Peyravian et al.

(10) Patent No.: US 7,480,384 B2
(45) Date of Patent: Jan. 20, 2009

(54) METHOD FOR DISTRIBUTING AND AUTHENTICATING PUBLIC KEYS USING RANDOM NUMBERS AND DIFFIE-HELLMAN PUBLIC KEYS

(75) Inventors: Mohammad Peyravian, Morrisville, NC (US); Allen Leonid Roginsky, Durham, NC (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 10/361,433

(22) Filed: Feb. 10, 2003

(65) Prior Publication Data

US 2004/0158715 A1 Aug. 12, 2004

(51) Int. Cl.
*H04L 9/00* (2006.01)
(52) U.S. Cl. .................................. 380/277
(58) Field of Classification Search .............. None
See application file for complete search history.

(56) References Cited

U.S. PATENT DOCUMENTS

| | | | |
|---|---|---|---|
| 4,799,258 A | 1/1989 | Davies | 380/21 |
| 5,920,630 A * | 7/1999 | Wertheimer et al. | 380/286 |
| 6,091,819 A | 7/2000 | Venkatesan et al. | 380/28 |
| 6,154,543 A | 11/2000 | Baltzley | 380/255 |
| 6,226,383 B1 | 5/2001 | Jablon | 380/30 |
| 6,230,269 B1 * | 5/2001 | Spies et al. | 713/182 |
| 6,292,895 B1 | 9/2001 | Baltzley | 713/168 |
| 6,317,829 B1 | 11/2001 | Van Oorschot | 713/155 |
| 6,370,250 B1 | 4/2002 | Stein | 380/281 |
| 6,389,136 B1 | 5/2002 | Young et al. | 380/28 |
| 6,487,660 B1 * | 11/2002 | Vanstone et al. | 713/168 |
| 7,007,164 B1 * | 2/2006 | Euchner | 713/168 |
| 2002/0067832 A1 * | 6/2002 | Jablon | 380/277 |
| 2003/0081785 A1 * | 5/2003 | Boneh et al. | 380/277 |
| 2003/0182554 A1 * | 9/2003 | Gentry et al. | 713/171 |

OTHER PUBLICATIONS

William Stallings, "Cryptography and Network Security Principles and Practice," Prentice Hall (c)1995, 2nd Edition, pp. 190-193.*

* cited by examiner

*Primary Examiner*—Emmanuel L Moise
*Assistant Examiner*—Nadia Khoshnoodi
(74) *Attorney, Agent, or Firm*—Schmeiser, Olsen & Watts; David R. Irvin; Anna Linne

(57) ABSTRACT

A method to exchange and authenticate public cryptographic keys between parties that share a common but secret password, using a pair of random numbers, a pair of Diffie-Hellman public keys computed from the random numbers and the password, a Diffie-Hellman symmetric secret key computed from the Diffie-Hellman public keys and the random numbers, and hashed values of arguments that depend upon these elements.

2 Claims, 3 Drawing Sheets

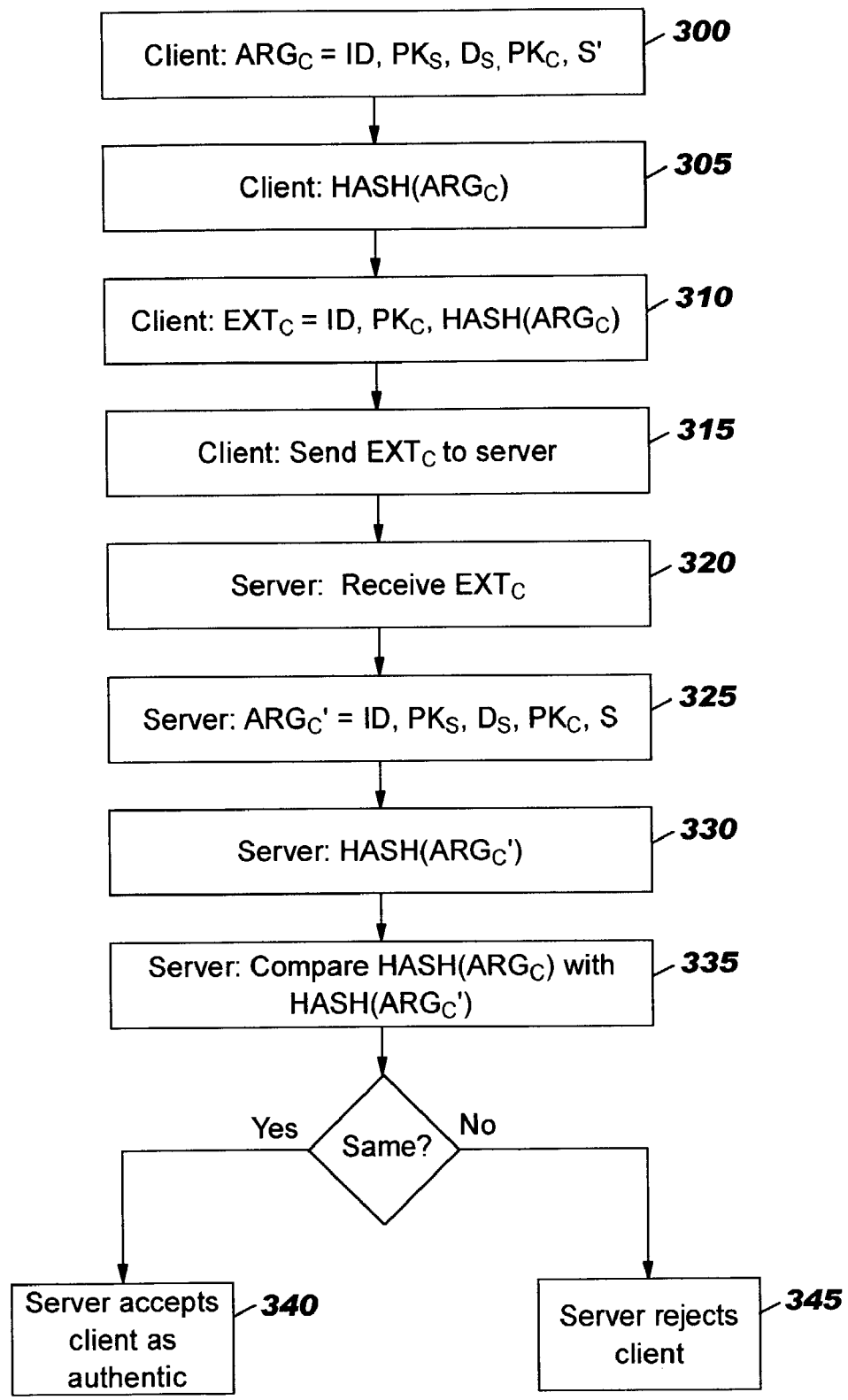

METHOD FOR DISTRIBUTING AND AUTHENTICATING PUBLIC KEYS USING RANDOM NUMBERS AND DIFFIE-HELLMAN PUBLIC KEYS

CROSS REFERENCE TO RELATED APPLICATIONS

Reference is made to the inventors' commonly assigned U.S. patent applications "Method for Distributing and Authenticating Public Keys Using Hashed Password Protection," and Method for Distributing and Authenticating Public Keys Using Time Ordered Exchanges," which were filed on the same day as the present application.

FIELD OF THE INVENTION

The invention relates to the field of data security, and more specifically to the field of distributing and authenticating public cryptographic keys.

BACKGROUND

Cryptography is the science of securing data. Various mechanisms have been proposed to accomplish this purpose and to defend against attacks on the security and privacy of electronic transmissions over communication channels. The most commonly used algorithms encrypt data according to a key that is known only to the sender and receiver of the transmission. These are called symmetric key algorithms, in that both the sender and the receiver share the same key, which must be kept secret. Several symmetric key algorithms are well known, perhaps the most notable among them being the Data Encryption Standard (DES) algorithm sponsored by the National Institute of Standards and Technology, and described by Schneier in *Applied Cryptograph*, John Wiley and Sons (second edition, 1996). Because a symmetric algorithm's encryption key must be kept secret, the key is often distributed using public key cryptography.

Public key cryptography was first proposed by Diffie and Hellman ("New Directions in Cryptography," IEEE Trans. Information Theory, vol. IT-22, no. 6, pp. 644-654, November 1976). Other public key algorithms are well known, including, for example, the RSA algorithm, as described by Rivest, Shamir, and Adelman ("A Method for Obtaining Digital Signatures and Public Key Cryptosystems," Comm. of the ACM, vol. 21. no. 2, pp. 120-126, February 1978) and the elliptic curve cryptosystem, as described by Koblitz ("Elliptic Curve Cryptosystems," Mathematics of Computation, vol. 48, no. 177, pp. 203-209, 1987) and by Miller ("Use of Elliptic Curves in Cryptography," Advances in Cryptology—Crypto '85 Proceedings, Springer-Verlag, pp. 417-426, 1986).

In public key cryptography, which employs an asymmetric algorithm, each user has a public key, which may be published and widely known, and a private key, which must be kept secret. The efficacy of public key cryptography follows from the difficulty of deriving a private key from its associated public key.

As mentioned above, an important application of public key cryptography is the distribution of symmetric encryption keys. Symmetric encryption keys that are distributed with the help of public key cryptography can be trusted to be secure and valid if all the protections are implemented and executed properly. Nevertheless, a question arises as to whether the public keys themselves can be trusted. For example, a party that publishes a public key may not in fact have possession of a corresponding private key, or the published public key may be corrupted or invalid. Encrypting sensitive data such as a symmetric encryption key using a somehow-bogus public key may result in a loss of privacy and diminished security.

Consequently, it has become important to authenticate public keys before using them, in order to ensure that public keys belong to legitimate parties. Authorities that can be trusted to do this have been set up. These authorities verify that public keys are correct and that they in fact belong to the parties claiming their ownership. Such an authority is often called a Certification Authority (CA). A CA validates a public key by issuing a certificate, which the CA signs using its own private key. A recipient of a signed certificate may then authenticate the certificate using the CAs public key to verify the signature.

This CA-based solution is often called a Public Key Infrastructure (PKI). A PKI includes the CAs, parent CAs capable of authenticating other CAs, and finally a root CA, which ultimately must be trusted, to authenticate the parent CAs. The various CAs and other parties that are part of the PKI act together according to agreed protocols and procedures. For example, ITU-T Recommendation X.509 (Information Technology—Open Systems Interconnection—The Directory: Authentication Framework, June 1997) is a widely accepted PKI standard that defines data formats and procedures pertaining to the distribution of public keys via public key certificates that are digitally signed by CAs.

Unfortunately, despite its many benefits, an X.509 PKI requires a massive and expensive infrastructure with complex operations. Thus there is a need for an alternative to the X.509 PKI that provides the same benefits but demands less in the way of bandwidth, storage, and complexity.

SUMMARY

The present invention provides an improved way to distribute and authenticate public cryptographic keys.

According to the invention, a client and a server know a common password a priori. The client generates a first random number, selects a prime modulus, and computes a first Diffie-Hellman public key from these, using the password. The client sends the first Diffie-Hellman public key and the prime modulus to the server. The server generates a second random number. Using the prime modulus, the password, and the second random number, the server generates a second Diffie-Hellman public key. Using the first Diffie-Hellman public key, the second random number, and the prime modulus, the server derives a Diffie-Hellman symmetric secret key. The server sends, to the client, the server's public cryptographic key, the second Diffie-Hellman public key, and a hashed value of an argument that includes the first Diffie-Hellman public key, the second Diffie-Hellman public key, the Diffie-Hellman symmetric secret key, the prime modulus, and the server's public cryptographic key.

The client receives the server's public cryptographic key, the second Diffie-Hellman public key, and the hashed value, from the server. The client then computes a second Diffie-Hellman symmetric secret key using the second Diffie-Hellman public key, the prime modulus, and the first random number. The client then computes the hashed value of an argument that includes the public cryptographic key of the server, the second Diffie-Hellman symmetric secret key, the prime modulus, the first Diffie-Hellman public key, and second Diffie-Hellman public key. The client compares the received hashed value with the computed hashed value. If the two are the same, the client accepts the server as authentic.

BRIEF DESCRIPTION OF THE DRAWINGS

FIG. 3 shows steps of the method according to the present invention for a client to distribute a public cryptographic key to a server and for the server to authenticate the client.

DETAILED DESCRIPTION

The invention is described below in the context of a server and a client, although the invention is not limited to this context, but applies generally to two machines. In the description that follows, the client may be a user's machine, and the server may be a service provider's machine. A secret password, which may be distributed over a secure channel, is assumed to be known by both the client and the server. The password is assumed to be sufficiently long so that a random guess by either an unauthorized user or a rogue service provider is highly unlikely to be correct. Such assumptions are made today with great evident success in the context of banking. For example, a banking user may receive his or her ATM-card and its associated password separately through the mail; the password is required to have at least a specified minimum number of characters. Perhaps more apropos to the present invention, however, banks, brokers, and others rely on these same general principles to provide secure transmission of identifiers and passwords to clients using Secure Socket Layer (SSL) applications.

In the description that follows, the following notation is used:

Dc—A Diffie-Hellman public key of the client;
Ds—A Diffie-Hellman public key of the server;
ID—client's user identifier, which need not be kept secret;
P—prime modulus for a Diffie-Hellman algorithm;
PW—secret one-time-use password that is known by both the client and the server;
PKc—initial public key component of the client's public/private key pair;
SKc—initial private key component of the client's public/private key pair;
PKs—initial public key component of the server's public/private key pair;
SKs—initial private key component of the server's public/private key pair;
eA(B)—data B encrypted with a symmetric key A using an agreed-upon symmetric encryption algorithm;
ePK(B)—data B encrypted with an asymmetric public key PK, using an agreed-upon asymmetric encryption algorithm;
eSK(B)—data B encrypted with an asymmetric private key SK, using an agreed-upon asymmetric encryption algorithm;
Rc—a secret random number generated by the client or on behalf of the client;
Rs—a secret random number generated by the server or on behalf of the server; and
S—a symmetric secret cryptographic key derived from the Diffie-Hellman algorithm.

Figure 1:
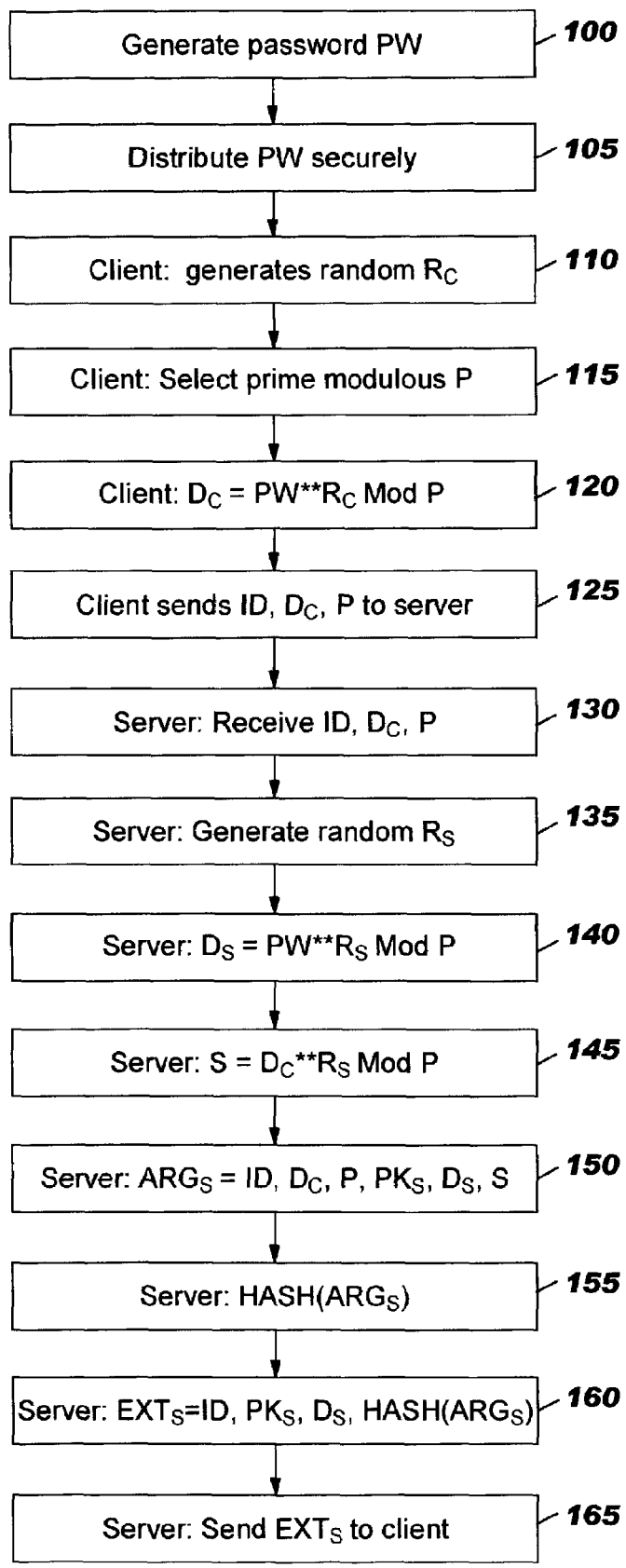
FIG. 1 shows steps of the method according to the present invention for a server to distribute a public cryptographic key to a client.

FIG. 1 shows steps of the method according to the present invention for a server to distribute a public cryptographic key to a client. As shown in FIG. 1, a password PW, which may be random, is generated using current practices (step 100), and distributed securely to the client and to the server (step 105). For example, the server may generate and send the pair (ID, PW) to the client using conventional mail, email, or telephone. Although the term password is used here, a pass phrase may be used instead, the difference between the two being only a matter of semantics regarding the number of characters involved.

The client generates a random number Rc (step 110), or reads such a random number generated on its behalf, and selects or reads a prime number (step 115) for use as the prime modulus P of subsequent computations based on the Diffie-Hellman algorithm, as explained below. The Diffie-Hellman algorithm is described in Schneier (op cit). The client then raises the password PW to the power Rc, and reduces the result modulo P, to provide a Diffie-Hellman public key Dc of the client (step 120). This is denoted here as Dc=PW**Rc ModP. The client then forms a concatenation of the client's ID, the Diffie-Hellman public key of the client Dc, and the prime modulus P, thereby giving ID,Dc,P, and sends the concatenation to the server (step 125).

The server receives the concatenation ID,Dc,P from the client (step 130), and generates a random number Rs (step 135), or reads such a random number generated on its behalf. The server then raises the password PW to the power Rs, and reduces the result modulo P, to provide a Diffie-Hellman public key Ds of the server (step 140). This is denoted here as Ds=PWRs ModP. The server, which has received Dc from the client, computes S=DcRs ModP (step 145), to provides a Diffie-Hellman symmetric secret key. The server then concatenates the client ID, the Diffie-Hellman public key of the client Dc, the prime modulus P, the public cryptographic key of the server PKs, the Diffie-Hellman public key of the server Ds, and the Diffie-Hellman symmetric secret key S, to provide an argument ARGs, where ARGs=ID,Dc,P,PKs,Ds,S (step 150). The server hashes the argument ARGs to provide a hashed value Hash(ARGs) (step 155). The hash function may be any collision-resistant hash function drawn from the art of cryptography. A preferred embodiment of the invention uses the Secure Hash Algorithm SHA-1, which is described by Schneier (op cit). Although the order of the concatenation that provides the argument ARGs is shown here for descriptive convenience as ID,Dc,P,PKs,Ds,S, any other permutations of the constituents of the argument ARGs may also be used. The server then forms an extended concatenation EXTs=ID,PKs,Ds,Hash(ARGs) (step 160), and sends the extended concatenation EXTs to the client (step 165). Again, the order of the constituents of the extended concatenation is not important. The server has now distributed its public key cryptographic PKs to the client, along with information the client may use as described below to authenticate the server.

Figure 2:
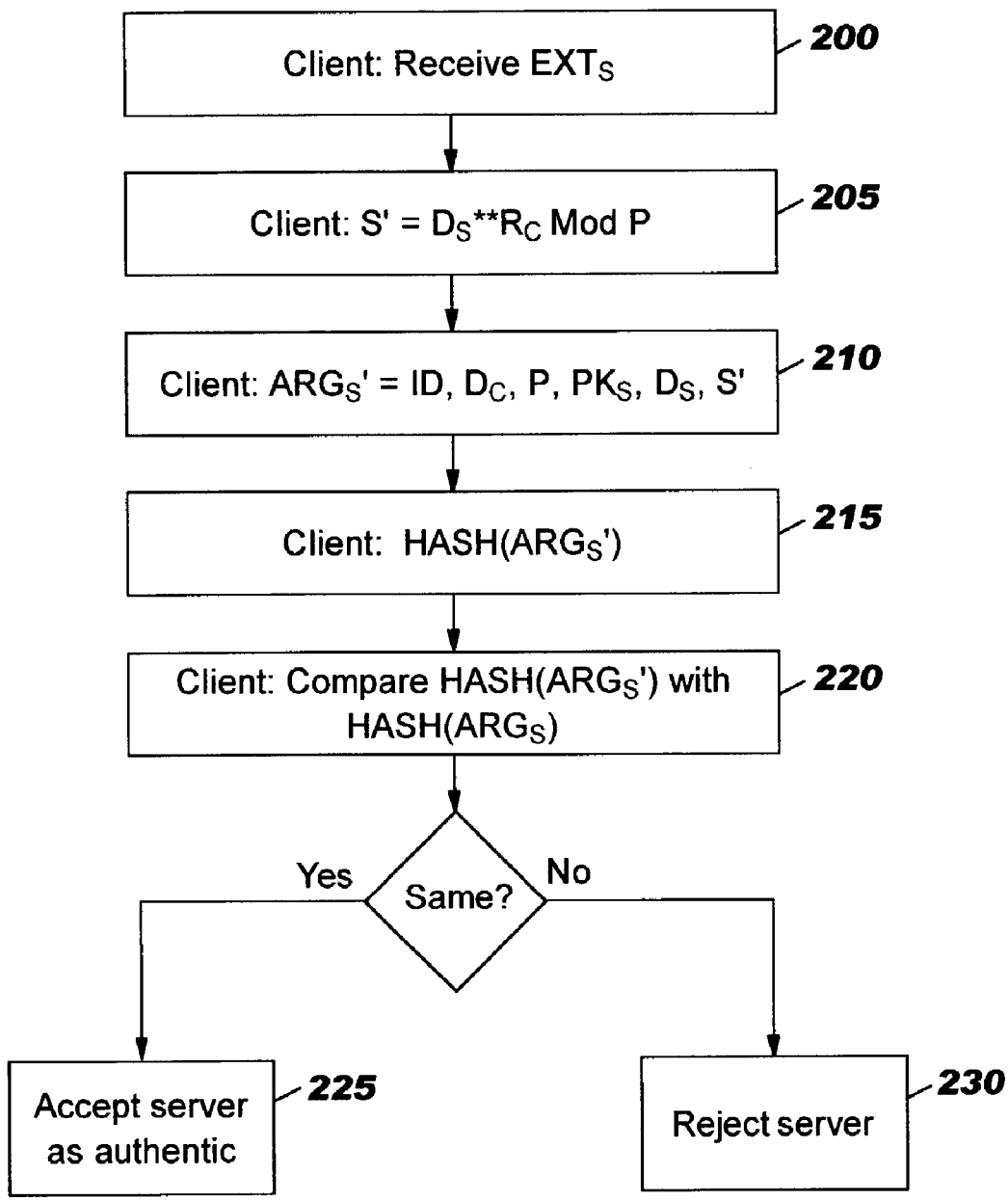
FIG. 2 shows steps of the method according to the present invention for a client to authenticate a public cryptographic key distributed by a server using the method discussed with reference to FIG. 1.

FIG. 2 shows steps of the method according to the present invention for the client to authenticate the server's public cryptographic key PKs. As shown in FIG. 2, the client receives the extended concatenation EXTs from the server (step 200), and now has tentative knowledge of the server's public cryptographic key PKs, of the server's Diffie-Hellman public key Ds, and of the hashed value Hash(ARGs). Using this knowledge, the client computes its own version of the Diffie-Hellman symmetric secret key, which is denoted here as S', where S'=Ds**Rc ModP (step 205).

The client then forms a concatenation ARGs'=ID,Dc,P, PKs,Ds,S' (step 210), and hashes the concatenation to provide a hashed value Hash(ARGs') (step 215). The client compares the received hashed value Hash(ARGs) with the computed hashed value Hash(ARGs') (step 220). If the two are the same, the client accepts the server's public cryptographic key PKs as authentic (step 225). Otherwise, i.e., the two versions of the hashed value are not the same, the client rejects the server's public cryptographic key PKs (step 230).

It is instructive to note that S'=S if the arguments of the computations are authentic. In essence, the server computes S=DcRs, where Dc=PWRc, hence S=PW**(Rc*Rs), where*denotes multiplication. The client computes S'=DsRc, where Ds=PWRs, hence S'=PW**(Rs*Rc). By commutativity, S'=S. The foregoing argument can be shown to be true specifically when applied to Modulo-P computations such as those of the invention.

Optionally, related processes may be employed by the client to distribute the client's public cryptographic key PKc to the server, and by the server to authenticate the client's public cryptographic key PKc. FIG. 3 shows suitable steps according to the present invention.

As shown in FIG. 3, the client forms the concatenation ARGc=ID,PKs,Ds,PKc,S' (step 300), and hashes ARGc to provide a hashed value Hash(ARGc) (step 305). The client forms an extended concatenation EXTc=ID,PKc,Hash (ARGc) (step 310), and sends the extended concatenation EXTC to the server (step 315). The server receives the extended concatenation EXTc (step 320). The client has thus distributed its public cryptographic key PKc to the server as part of EXTc.

To authenticate the client, the server forms the concatenation ARGc'=ID,PKs,Ds,PKc,S (step 325), hashes the concatenation ARGc' to provide a computed hashed value Hash (ARGc') (step 330), and compares the received hashed value Hash(ARGc) with the computed hashed value Hash(ARGc') (step 335). If the two are the same, the server accepts the client's public cryptographic key PKc as authentic (step 340). Otherwise, i.e., the two versions of the hashed value are not the same, the server rejects the client's public cryptographic key PKc (step 345).

Thus the server has authenticated the client, the client has authenticated the server, and the public cryptographic keys PKs and PKc have been exchanged. Now the client and the server can use public key cryptography further, with confidence that the public keys are authentic. The client and the server may discard the password PW, as it is not used again. Neither the client nor the server accept any further messages supposedly protected according to PW. Moreover, at this point there is no longer any need to keep PW secret, as PW has been used only for authentication rather than for encryption of sensitive data.

The invention may be used for authenticating public encryption keys that are already known or that are distributed using some other technique. In such situations, there is no need to include PKs in ARGs (FIG. 1, step 150), in EXTs (FIG. 1, step 160), or in ARGs' (FIG. 2, step 210). Likewise, there is no need to include PKc in ARGc (FIG. 3, step 300), in EXTc (FIG. 3, step 310), or in ARGc' (FIG. 3, step 325).

The method described above may be used to recover when either the client or the server has knowledge that its private key SKc or SKs, respectively, is compromised. If the client's private key SKc is compromised, the client sends an "SKc compromised" message to the server in the concatenation ID,"SKc compromised",eSKc(Hash(ID,"SKc compromised")), where eSKc(x) denotes encryption of x using the private key SKc. If the server has the client's public key, the server verifies the signature. If the signature is valid, the client and server suspend the exchange of data while the client determines a new public key and private key. The client then sends its new public key to the server as described above. If the server does not have the client's public key, or if the signature is invalid, the server ignores the message.

If the server's private key SKs is compromised, the server sends an "SKs compromised" message to the client in the concatenation ID,"SKs compromised",eSKs(Hash(ID,"SKs compromised")), where eSKs(x) denotes encryption of x using the private key SKs. If the client has the server's public key, the client verifies the signature. If the signature is valid, the client and server suspend the exchange of data while the server determines a new public key and private key. The server then sends its new public key to the client as described above. If the client does not have the server's public key, or if the signature is invalid, the client ignores the message.

From the foregoing description, those skilled in the art will now appreciate that the present invention provides an economical alternative to an X.509 PKI for distributing and authenticating public cryptographic keys. The foregoing description is illustrative rather than limiting, however, and the invention is limited only by the claims that follow.

We claim:

1. A method for a second machine to distribute a public cryptographic key ($PK_s$) to a first machine, said method comprising:

receiving message data, by the second machine from the first machine as a result of the message data having been sent by the first machine to the second machine, wherein the message data consists of a concatenation of an identifier (ID) of the first machine, a character string (Str-$PK_c$) denoting that a private key ($PK_c$) of the first machine has been compromised, and $eSK_c$(Hash(ID, Str$PK_c$)), wherein Hash(ID,Str$PK_c$) denotes a hashing of ID and Str$PK_c$, and wherein $eSK_c$(Hash(ID,Str$PK_c$)) denotes an encryption of Hash(ID,Str$PK_c$) using the private key $PK_c$ to form a signature represented by the encryption;

after said receiving the message data, said second machine verifying the signature using a public key associated with $PK_c$;

after a suspension of data exchange between the first machine and the second machine after said verifying the signature, receiving a message, by the second machine from the first machine as a result of the message having been sent by the first machine to the second machine, wherein the message consists of a concatenation of ID, a first Diffie-Hellman public key ($D_c$), and a prime modulus (P), wherein Dc=(PW**$R_c$) Mod P, wherein PW is a secret password known by both the first machine and the second machine, and wherein $R_c$ is a first random number;

after said receiving the message, generating, by the second machine, a second random number ($R_s$);

after said generating $R_s$, computing, by the second machine, a second Diffie-Hellman public key ($D_s$) according to $D_s$=(PW**$R_s$) Mod P;

after said computing $D_s$, computing, by the second machine, a Diffie-Hellman symmetric secret key (S) according to S=(Dc**$R_s$) Mod P;

after said computing S, providing, by the second machine, an argument ($ARG_s$) that consists of a concatenation of ID, $D_c$, P, $PK_s$, $D_s$, and S;

after said providing $ARG_s$, hashing $ARG_s$, by the second machine, to provide a hashed value denoted as Hash ($ARG_s$);

after said hashing $ARG_s$, forming, by the second machine, an extended concatenation $EXT_s$ that consists of a concatenation of ID, $PK_s$, $D_s$, and Hash($ARG_s$); and after said forming $EXT_s$, sending, by the second machine to the first machine, $EXT_s$.

2. A method for a first machine to authenticate a public cryptographic key ($PK_s$) of a second machine, said method comprising:

sending, by the first machine to the second machine, message data consisting of a concatenation of an identifier (ID) of the first machine, a character string ($StrPK_c$) denoting that a private key ($PK_c$) of the first machine has been compromised, and $eSK_c(Hash(ID,StrPK_c))$, and wherein $eSK_c(Hash(ID,StrPK_c))$ denotes an encryption of $Hash(ID,StrPK_c)$ using the private key $PK_c$ to form a signature represented by the encryption;

after said sending the message data and after a suspension of data exchange between the first machine and the second machine following verification of the signature by the second machine using a public key associated with $PK_c$, generating, by the first machine, a first random number ($R_c$);

after said generating $R_c$, computing, by the first machine, a first Diffie-Hellman public key ($D_c$), wherein $Dc=(PW^{**}R_c)$ Mod P, wherein PW is a secret password known by both the first machine and the second machine, and wherein P is a prime modulus;

after said computing $D_c$, sending, by the first machine to the second machine, a message consisting of ID, $D_c$, and P;

after said sending the message, receiving an extended concatenation $EXT_s$, by the first machine from the second machine as a result of $EXT_s$ having been sent by the second machine to the first machine, wherein $EXT_s$ consists of a concatenation of ID, $PK_s$, a second Diffie-Hellman public key ($D_s$), and a first hashed value Hash ($ARG_s$), wherein $ARG_s$ consists of a concatenation of ID, $D_c$, P, $PK_s$, $D_s$, and a first Diffie-Hellman symmetric secret key (S), wherein $D_s=(PW^{}R_s)$ Mod P, wherein $R_s$ is a second random number, and wherein $S=(D_c^{}R_s)$ Mod P;

after said receiving $EXT_s$, computing, by the first machine, a second Diffie-Hellman symmetric secret key (S') according to $S'=(D_s^{**}R_c)$ Mod P;

after said computing S', providing, by the first machine, an argument ($ARG_s'$) that consists of a concatenation of ID, $D_c$, P, $PK_s$, $D_s$, and S';

after said providing $ARG_s'$ hashing $ARG_s'$, by the first machine, to provide a hashed value denoted as Hash ($ARG_s'$); and after said hashing $ARG_s'$, determining, by the first machine, that Hash($ARG_s'$) is equal to Hash($ARG_s$) to confirm that $PK_s$ is authentic.

* * * * *